United States Patent [19]

Cowan

[11] Patent Number: 5,031,509
[45] Date of Patent: Jul. 16, 1991

[54] ANTI-LEAK SEAL FOR PUMP MOTOR

[75] Inventor: Philip L. Cowan, Houston, Tex.

[73] Assignee: Titan Tool, Inc., Roslyn, N.Y.

[21] Appl. No.: 402,980

[22] Filed: Aug. 31, 1989

Related U.S. Application Data

[63] Continuation of Ser. No. 173,300, Mar. 25, 1988, abandoned.

[51] Int. Cl.[5] .............................................. F01B 31/00
[52] U.S. Cl. ..................................... 92/86; 277/3; 277/24; 91/222; 91/235
[58] Field of Search .................. 92/86; 277/3, 23, 24; 91/222, 235; 417/401

[56] References Cited

U.S. PATENT DOCUMENTS

| | | | |
|---|---|---|---|
| 2,348,004 | 5/1944 | Gruetjen . | |
| 2,526,236 | 10/1950 | Ingres | 92/86 |
| 3,293,994 | 12/1966 | Napolitano | 92/86 |
| 3,584,331 | 6/1971 | D'Hooge | 92/86 |
| 3,768,371 | 10/1973 | Orme | 92/86 |
| 3,810,634 | 5/1974 | Hakansson | 92/86 |
| 3,865,015 | 2/1975 | Hakansson . | |
| 3,869,963 | 3/1975 | Schindel | 92/86 |
| 4,245,844 | 1/1981 | Pohl et al. . | |
| 4,249,451 | 2/1981 | Le Moal . | |
| 4,417,442 | 11/1983 | Ikenoya et al. | 60/293 |

Primary Examiner—Edward K. Look
Assistant Examiner—Thomas Denion
Attorney, Agent, or Firm—James L. Jackson

[57] ABSTRACT

Method and apparatus for recovering leaked fluid or directing fluid flow or propagation through utilization of negative pressure pulses occurring in a pressurized fluid system. The invention has particular application in double acting hydraulic fluid motors where leakage of hydraulic fluid past the output shaft seal may be efficiently collected and redirected into the pressurized hydraulic fluid system through utilization of negative pressure pulses that are developed periodically by fluid direction changes during operation of the hydraulic fluid motor.

17 Claims, 2 Drawing Sheets

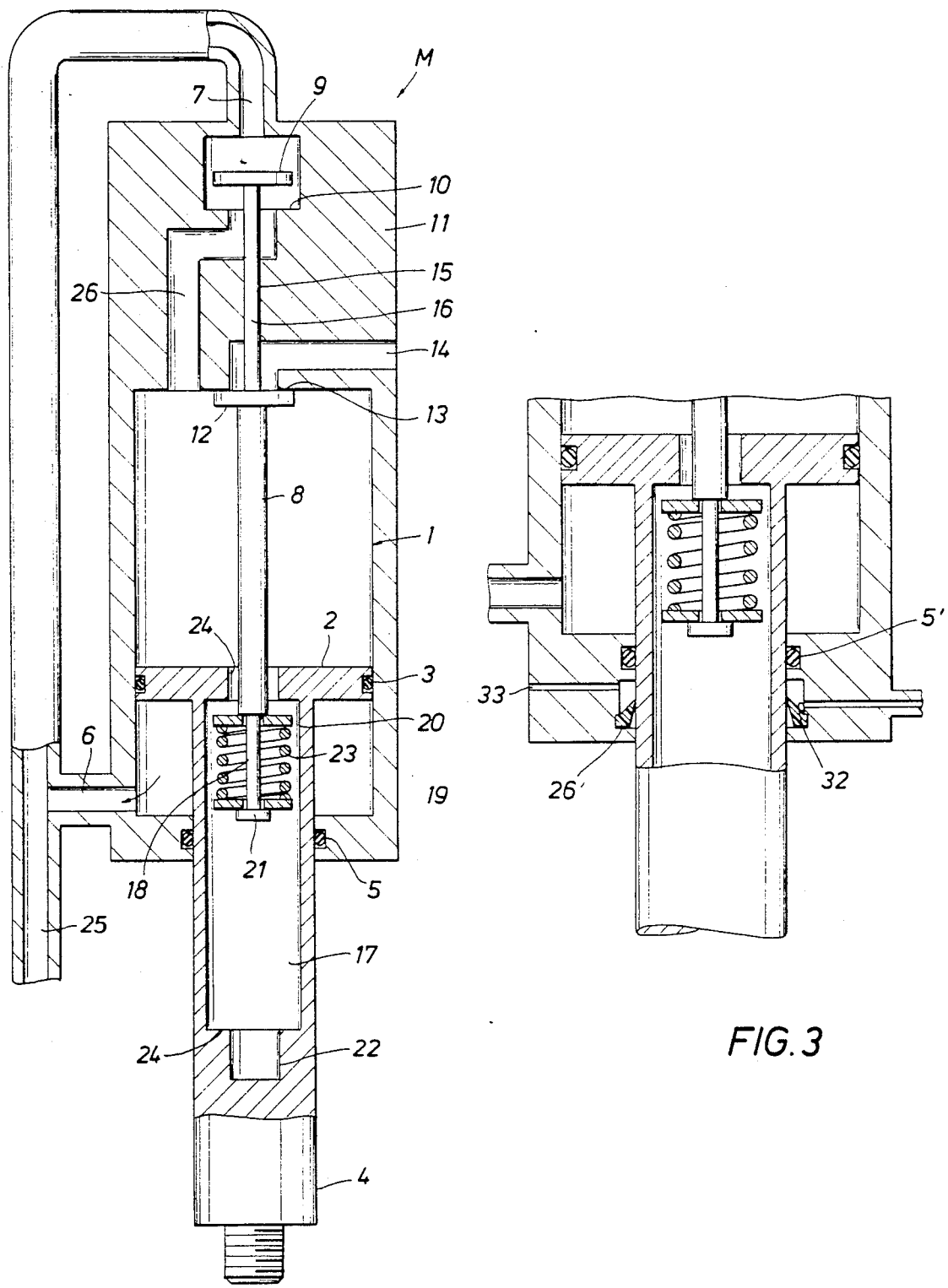

ANTI-LEAK SEAL FOR PUMP MOTOR

This is a continuation of application Ser. No. 173,300, filed on Mar. 25, 1988, now abandoned.

FIELD OF THE INVENTION

This invention relates generally to apparatus having a pressurized fluid system for operation thereof and wherein leakage of pressurized fluid from the fluid system is ordinarily prevented by one or more seal members that through wear and deterioration from other causes, may develop leakage of fluid More specifically, this invention relates to a method or methods for reducing leakage from sliding or rotating seals in hydraulic systems.

BACKGROUND OF THE INVENTION

Many different types of mechanical devices are provided having pressurized fluid systems for operation thereof. The present invention, though being described particularly as it relates to double acting hydraulic motors such as is commonly used in paint pumps and the like, has a wide variety of applications in various and sundry fluid energized mechanisms wherein the methods of the present invention are applicable. The term "fluid" as utilized herein is intended to encompass a wide variety of liquid compositions including water, oil such as hydraulic oil and various other compositions including a liquid as a material constituent thereof. The term "liquid" as utilized herein is intended to mean any material or composition of materials capable of flowing, without regard to the particular viscosity thereof.

The use of hydraulic cylinders for a variety of mechanical applications is well known. In general, great care is taken in the design of the seals around the moving piston to prevent leakage of hydraulic oil out of the system. In spite of the best seal technology available, leakage is inevitable as the seals and piston wear during normal use of the apparatus. In most cases the initial leakage is small and is generally accepted. The hydraulic reservoir of the apparatus is refilled occasionally to replace the lost fluid.

In some applications any degree of leakage can have serious effect. One such application is a hydraulically operated paint pump which can be used to deliver paint to spray guns in industrial plants. Leakage of oil in this environment, even though slight, over extended periods of time can result in contamination of the paint supply. In some instances paint is stored in large containers and oil contamination can be very expensive because of the expensive paint that must be discarded as unusable. This invention pertains to a method for automatically and inexpensively collecting oil which leaks from the cylinder and directing the leaked oil back into the hydraulic system, thus preventing it from causing contamination to materials or apparatus externally of the fluid energized motor or device.

Many different types of mechanical devices, such as the hydraulic motors for paint pumps, incorporate a housing structure having internal movable components and form or otherwise incorporate a pressurized fluid system for operation thereof. In most cases, the mechanical device, to provide a work output, will have an output shaft that rotates, reciprocates or includes a combination of rotation and reciprocation in its movement. The housing structure of the apparatus in such cases defines a passage through which the output shaft extends and a seal, such as a resilient O-ring or any other commercially available sealing device is utilized to establish a seal between the output shaft and the housing. Obviously these sealing devices are always designed to prevent leakage of liquid materials such as lubricating oils, hydraulic oil, etc. from the mechanical device. Through normal wear, unusual seal erosion or other character of seal deterioration leakage will develop in time. In some cases, a small amount of leakage is tolerated until the apparatus can be shut down for repair. In many cases, especially in the cases of fluid motors for paint pumps, even a small amount of leakage can cause contamination of a large volume of paint, thereby requiring that the paint be discarded. In mechanical devices where even minimal seal leakage is undesirable the present invention has application. It is therefore desirable to provide an anti-leakage system for mechanical apparatus having a fluid energized system for operation thereof or a fluid system providing other necessary features such as lubrication, cooling, etc.

SUMMARY OF THE INVENTION

It is therefore a principal feature of the present invention to provide a novel method or methods for minimizing leakage from sliding or rotating seals in various mechanical devices especially in mechanical devices having pressurized hydraulic systems for operation thereof.

It is also a feature of this invention to provide a novel method for collecting leakage of fluid flowing past a seal provided for sealing thereof and for returning the leaked fluid to the fluid system of the apparatus.

It is another feature of this invention to provide a novel method for collecting fluid leaking past a seal and for utilizing negative pressure pulses in the pressurized fluid system of the apparatus for developing the motive force for injection of the leaked fluid into the operating fluid system of the apparatus.

It is another important feature of this invention to provide novel apparatus having a pressure energized fluid system for operation thereof and incorporating a fluid collection system having a leakage collection chamber and a check valve controlled passage extending from the leakage collection chamber to the pressurized fluid system of the apparatus, wherein the check valve permits unidirectional flow of fluid in the liquid transfer passage only during periodic negative pressure pulses in the pressurized fluid system of the apparatus.

Briefly, this invention provides for a simple, inexpensive method for collecting leaking fluid such as hydraulic oil from a pressurized fluid system and feeding it back into the pressurized system. The system described relates to a reciprocating hydraulic cylinder but it will be evident that the invention can have many other styles of application in conjunction with hydraulically controlled apparatus and other types of fluid energized systems.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 2 is a similar vertical section of a double acting hydraulically energized motor which is representative of the prior art and which shows the hydraulic cylinder and drive shaft being moved downwardly.

FIG. 3 is a fragmentary sectional view of a double acting hydraulically energized motor incorporating a leakage collection system representing a modified embodiment of this invention.

DETAILED DESCRIPTION OF PREFERRED EMBODIMENT

Figure 1:
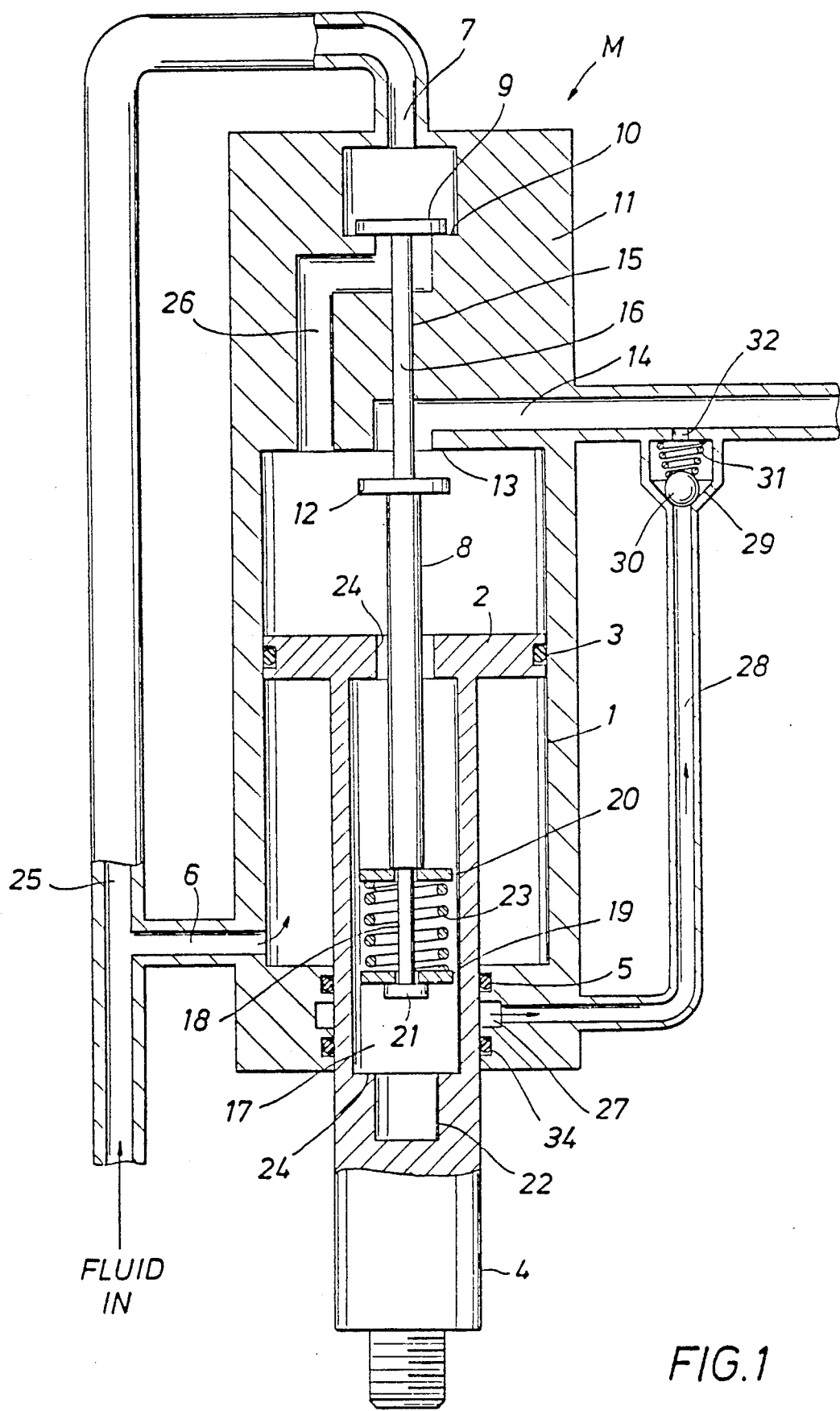
FIG. 1 is a vertical sectional view of a double acting hydraulic motor incorporating a reciprocating hydraulic cylinder such as might be utilized to drive a paint pump in industrial applications and incorporating a seal leakage collection system constructed in accordance with the present invention.

Referring now to the drawings, for the purpose of description of the invention a reciprocating hydraulic cylinder will be considered. Such a cylinder is illustrated in FIGS. 1, 2 and 3 and might be utilized to drive a paint pump in industrial applications. The hydraulic cylinder is merely representative of one possible embodiment of this invention and it is to be understood that this invention has application in many types of machines and devices employing pressurized fluid operating systems. The structure and operation of the hydraulic cylinder is as follows:

Referring now specifically to FIG. 1, the fluid from a pressurized hydraulic fluid supply is delivered to conduit 25 and enters the lower part of a cylinder 1 through conduit 6. A load bearing extension member 4 in the form of an elongated output shaft is formed integrally with or otherwise connected to a piston 2 which is disposed for reciprocation within the cylinder 1. The piston 2 is sealed against the inner cylindrical wall of the cylinder by means of a circular sealing element 3. The sealing element S may conveniently take the form of a circular resilient O-ring or any one of a number of other suitable circular sealing elements or sealing assemblies within the spirit and scope of this invention Fluid entering conduit 7 from conduit 25 is prevented from entering into the cylinder by the sealing contact of valve member 9 on the annular seat 10. Because of the fluid pressure acting on the lower surface of the piston 2, the piston will move upwardly, thus also inducing upward movement of the load bearing extension 4 of the piston. Hydraulic oil in the cylinder 1 above the piston 2 will exhaust the cylinder through conduit 14 and thus return to a hydraulic reservoir. The hydraulic reservoir is in communication with a hydraulic pump which functions as the supply for pressurized hydraulic fluid.

When the piston 2 nears the top of the cylinder the sliding collar 19 on the shaft 18 will contact the internal shoulder surface 24 defined by the interior surface configuration of the load bearing output shaft 4. The action of the hydraulic pressure on valve plate 9 holds the valve plate in place on the seat 10 and prevents the valve plate from opening. As the piston 2 continues its upward movement under the influence of hydraulic fluid pressure beneath the piston, the sliding collar 19 will move upwardly on shaft 18 compressing the spring 23. When the spring compression force equals the seating force of the hydraulic fluid on valve 9, the valve will lift off of its seat and the spring 23 will force the valve plate 12 into sealing engagement with the sealing surface 13 thus blocking the exhaust conduit 14 in the manner shown in FIG. 2.

With valve 9 unseated from seat 10 in the manner shown in the prior art version of the double acting fluid motor represented by FIG. 2, the hydraulic oil can now pass through conduit 7 and 26 into the region in the cylinder 1 above the piston 2. Since the surface area defined by the upper portion of the piston 2 and exposed to the fluid pressure, is greater than the surface area of the piston which is exposed to the fluid pressure in the lower region of the fluid motor below the piston, the piston and load member will be forced downwardly by the resulting fluid pressure induced force differential.

As the piston 2 nears the bottom of the cylinder 1 the sliding collar 20 will be contacted by the lower surface portion of the piston thus forcing the collar 20 downwardly and compressing the spring 23. The pressure of the hydraulic fluid within the upper region of the fluid motor acts on the surface area of the valve 12 and develops a resultant force holding the valve against the seat 13. As the piston continues its downward movement, the sliding collar 20 will be forced downwardly on the shaft 18 thereby compressing the spring 23. When the spring force equals the sealing force on the valve 12, the valve will lift off of the valve seat 13 and the spring 22 will then rapidly shift the valving mechanism thereby seating valve 9 against the seat 10 as shown in FIG. 1. At this point, the flow of hydraulic fluid in passages 14 and 26 will have been changed by valve control such that it ceases in passage 26 and is permitted in passage 14 thus causing the piston to resume its upward stroke.

It can be seen, therefore, that the piston will reciprocate up and down within the cylinder under the influence of the hydraulic driving fluid. The rod 16 connecting valves 9 and 12 slides in bore 15 in the cylinder head 11. The fit of the pin 16 in bore 15 is controlled so as to limit the leakage of fluid between conduits 14 and 26.

In FIG. 2 representing the prior art, a seal 5 of the conventional configuration for a hydraulic cylinder is shown. The seal member 5 can be in the form of a conventional resilient O-ring as shown, or, if desired, take the form of one of the many commercially available seals. Oil leaking past this seal will escape from the hydraulic system and must be replaced. Under circumstances where oil leakage might contaminate other compositions such as paint or other mechanical devices, it is desirable to eliminate the leakage. Since leakage of fluid seals can not be precluded indefinitely, unless the apparatus is regularly serviced prior to the development of leakage, it is desirable to provide a system for collecting the leaked fluid and providing for its proper disposal. According to the present invention, control and disposal of leaked fluid bypassing seal member 5 may conveniently take the form illustrated in FIG. 1 and FIG. 3 which are merely representative examples of the present invention.

FIG. 1 illustrates incorporation of the present invention in a double acting hydraulic motor such as is typically utilized to drive paint pumps In this embodiment a secondary seal 34 is employed to establish additional sealing between the housing structure of the fluid motor and the load bearing output shaft 4. The secondary seal 34 cooperates with seal 5 to isolate an annular leakage collection chamber 27 which is defined by an annular cavity in the housing structure which surrounds the load bearing member. A passage 28 provides communication between the leakage collection chamber 27 and the passage 14 of the pressurized fluid supply system. The passage 28 is defined in part by the housing structure of the double acting motor and also by a conduit extending from the housing and being interconnected with a conduit defining passage 14 of the return portion of the fluid supply system. The conduit forming passage 28 defines a check valve having a valve seat 29 against which a ball check member 30 is adapted to seat. The ball check member 30 is loaded by means of a compression spring 31 thus normally inducing the ball check to remain seated against the valve seat 29. The region above the ball check member 30 is communicated by a port 32 with the oil discharge conduit 14 of the double acting motor. For most of one operating cycle of the double acting motor, while valve 12 is seated on seat 13, the pressure in passage 14 will be slightly above or below atmospheric pressure depending upon the relative height of the fluid in the reservoir to the height of the passage 14. The ball check 30 will remain seated against its valve seat 29 by the force of compression spring 31 and thus oil is prevented from entering conduit 28. The spring bias on the ball check member 30 should be sufficient to prevent the ball from unseating if the pressure in passage 14 is below atmospheric when tho fluid in passage 14 is at rest. At the reversal of the piston at the top of its stroke, the oil flowing from above the piston to into channel 14 is suddenly interrupted by the closing of valve 12 onto seat 13. The closing of valve 12 with fluid in motion in the passage 14 will result in the development of a negative pressure wave or pulse traveling away from the valve 12 and down the passage 14 past the orifice 32. It has been found that this negative pressure wave will momentarily unseat the ball check member 30 and thereby create a vacuum in the passage 28 and the leakage collection chamber 27. Each time the valve 12 reverses at the top of its stroke a similar vacuum pumping action will take place. It is therefore a simple matter to maintain a negative pressure condition in passage 28 and leakage collection chamber 27. It will now be evident that this will serve to keep oil from leaking out of the system. Oil which may leak past seal 5 will remain in the leakage collection chamber 27 because of the negative pressure in the cavity. If any leakage occurs past the secondary seal 26, it will take the form of air being drawn from the atmosphere into the leakage collection chamber 27 by virtue of the negative pressure condition in the passage 26 and the leakage collection chamber. Because of this negative pressure condition, oil, if present in the leakage chamber will not flow past the secondary seal. If a quantity of oil enters the leakage collection chamber 27 and passage 28 to completely fill the passage 28, the oil will simply be siphoned past the ball check member 30 into the fluid discharge passage 14 to be transported by passage 14 to the oil reservoir.

It will be obvious to one skilled in the art that the vacuum generated in passage 28 could, upon suitable ducting, be used to purge oil from seals elsewhere in the hydraulic system. In a paint pump application, for example, the device could be used to prevent leakage from seals on a hydraulic motor driven agitator which might be located adjacent to the paint pump. Similarly in apparatus other than paint pumps where mechanical devices having pressure energized fluid systems are utilized negative pressure pulses in the pressurized fluid supply system may be similarly utilized for activities that are developed by negative pressure.

An alternative seal design for the subject invention is illustrated in FIG. 3. In this configuration the secondary seal 26' is of a conventional wiper design with the lips of the seal directed upwardly. Oil leaking past the primary seal 5' will collect in the leakage collection chamber 32 below the lip of the seal member. In this case the seal member functions as a wiper to remove fluid from the shaft of the load bearing member and direct it outwardly into the leakage collection chamber. A fluid passage 33 connects the region between the seals 5' and 26' to atmospheric pressure A small diameter capillary conduit 28' connects the region 32 where the oil collects to a check valve that may be identical with the check valve 29 of FIG. 1.

In this arrangement the oil leaking past seal 5 will be continuously siphoned off with each vacuum pulse as air flows through the conduits 33 and 28', and the region between seals 5' and 26' will always remain completely free of oil. This configuration is preferred if rolling or turning of the seal 26 in FIG. 1 allows for some leakage, even under vacuum conditions. The use of a capillary tube for conduit 28' prevents oil which has been collected from running back down into the seal cavity.

It will be readily apparent that the invention disclosed herein can cover a wide range of hydraulic devices and is not limited to use in a reversing cylinder of the type shown. Any time a flow of fluid is rapidly interrupted a negative pulse is generated downstream and such negative pulse can be utilized according to this invention as the motive force to draw fluid from seals at any point in the system.

In view of the foregoing it is respectfully submitted that a novel method has been provided by the present invention which enables vacuum induced collection of seal leakage in mechanical devices such as fluid energized motors having negative pressure waves or pressure pulses in the pressurized fluid systems for operation thereof. These negative pressure waves or pulses may also be employed to provide other negative pressure induced functions as is desirable and within the capability within the equipment involved.

In view of the foregoing, it is respectfully submitted that an automatically activated anti-leakage system has been effectively developed for double acting pump motors and other mechanical devices which accomplishes all of the features and objects herein above set forth together with other features which are inherent in the apparatus itself. It will be understood that certain combinations and subcombinations of this invention are of utility and may be employed without reference to other features in some combinations This is contemplated by and is within the scope of the present invention

What is claimed is:

1. A method for accomplishing hydraulically energized vacuum induced movement of liquid in conjunction with apparatus having a hydraulic system for operation thereof which develops negative pressure pulses of a pressure below atmospheric pressure, said method comprising:
   (a) providing a conductor for communication between the liquid to be moved and said hydraulic system for said apparatus;
   (b) controlling communication between said hydraulic system and said liquid to be moved only during the presence of said negative pressure pulses and thus placing said liquid to be moved under a condition of intermittent negative pressure for vacuum induced movement thereof; and (c) preventing communication of positive pressure from said hydraulic system to said liquid to be moved.

2. The method of claim 1 wherein check-valve means is utilized to control communication between said fluid to be moved and said hydraulic system and to prevent said communication of positive pressure from said hydraulic system to said liquid to be moved.

3. The method of claim 1 wherein:
said negative pressure pulses are generated by sudden interruption of the flow of a column of hydraulic fluid in said hydraulic system.

4. A method for recovering leaked liquid in apparatus having a hydraulic system for operation thereof which develops negative pressure pulses of a pressure below atmospheric pressure, said method comprising:
(a) providing leakage collection means to receive said leaked liquid; and
(b) applying said negative pressure pulses to said leakage collection means for inducing flow of said leaked liquid from said leakage collection means into said hydraulic system only during said negative pressure pulses.

5. The method of claim 4, including:
maintaining said leakage collection means at environmental pressure at times other than during said periodic negative pulses.

6. The method of claim 5, wherein said environmental pressure is atmospheric pressure.

7. The method of claim 4, wherein said apparatus incorporates a housing having an internal movable member extending from said housing and seal means normally establishing a seal between said housing and said internal movable member and;
(a) said leakage collection means is a chamber defined by said housing and located externally of said seal means;
(b) passage means communicates said leakage collection means with said hydraulic system; and
(c) check valve means controls communication between said passage means and said hydraulic system only during the presence of negative pressure pulses in said hydraulic system.

8. The method of claim 4, wherein said leakage collection means is a chamber defined by said housing, said apparatus forming leakage passage means communicating said chamber with said hydraulic system and having a check valve permitting vacuum induced flow of leaked liquid from said chamber and preventing flow of hydraulic fluid from said hydraulic system to said chamber.

9. A method for negative pressure induced injection of a liquid into a hydraulic system by means of negative pressure pulses generated within said hydraulic system, comprising:
(a) developing negative pressure pulses in said receiver by sudden interruption of the flow of a column of hydraulic fluid of said hydraulic system;
(b) providing a source of injection liquid;
(c) applying said negative pressure pulses to said source of injection liquid for inducing flow of said injection liquid from said source of injection liquid into said hydraulic system; and
(d) preventing the flow of hydraulic fluid from said hydraulic system to said source of injection fluid during positive pressure conditions of said hydraulic system.

10. The method of claim 9, including:
maintaining said source of injection liquid at environmental pressure except during said negative pressure pulses.

11. In apparatus having a hydraulic system for operation thereof and developing negative pressure pulses in said hydraulic system during such operation by sudden interruption of the flow of column of hydraulic fluid, and wherein said negative pressure pulses are below atmospheric pressure, the improvement comprising:
(a) a source of liquid intended for movement;
(b) passage means communicating said source of liquid with said hydraulic system; and
(c) control means permitting communication between said source of liquid and said hydraulic system only during the presence of negative pressure pulses in said hydraulic system, whereby said liquid is subjected to said negative pressure pulses for vacuum induced movement thereof.

12. Apparatus as recited in claim 11, comprising:
(a) housing means forming a portion of said hydraulic system and incorporating a movable element extending from an opening of said housing means;
(b) seal means establishing a seal between said housing means and said movable element;
(c) leakage collection means being defined by said housing means;
(d) said passage means being in communication with said leakage collection means said hydraulic system: and
(d) said control means being pressure responsive valve means permitting communication between the said hydraulic system and said leakage collection means only during the presence of negative pressure pulses in said hydraulic system.

13. Apparatus as recited in claim 12, wherein said seal means comprises primary and secondary seal elements each establishing a seal between said housing means and said internal movable element, said primary and secondary seal elements being disposed on opposite sides of said leakage collection means.

14. Apparatus as recited in claim 13, wherein said primary and secondary seal elements are in the form of circular sealing elements.

15. Apparatus as recited in claim 14, wherein said secondary sealing element is in a form of an annular wiping ring having a thin circular wiping lip in contact with said internal movable element, said thin circular wiping lip being oriented to direct leaked liquid to said passage means.

16. Apparatus as recited in claim 13, wherein vent passage means communicates said leakage collection means with environmental pressure.

17. Apparatus as recited in claim 12, wherein said passage means is a capillary passage extending from said leakage collection means to said check valve.

* * * * *